(12) United States Patent
Kim

(10) Patent No.: US 10,083,212 B2
(45) Date of Patent: Sep. 25, 2018

(54) METHOD AND APPARATUS OF REPRESENTING CONTENT INFORMATION USING SECTIONAL NOTIFICATION METHOD

(71) Applicant: HUMAX CO., LTD., Seongnam (KR)

(72) Inventor: Kyung Koo Kim, Seongnam (KR)

(73) Assignee: HUMAX CO., LTD., Seongnam (KR)

( * ) Notice: Subject to any disclaimer, the term of this patent is extended or adjusted under 35 U.S.C. 154(b) by 376 days.

(21) Appl. No.: 14/184,682

(22) Filed: Feb. 19, 2014

(65) Prior Publication Data

US 2015/0106387 A1    Apr. 16, 2015

(30) Foreign Application Priority Data

Oct. 11, 2013  (KR) ........................ 10-2013-0121293

(51) Int. Cl.
| | | |
|---|---|---|
| G06F 17/30 | (2006.01) | |
| H04N 21/431 | (2011.01) | |
| H04N 21/482 | (2011.01) | |
| G11B 27/10 | (2006.01) | |
| G11B 27/34 | (2006.01) | |

(52) U.S. Cl.
CPC ........ *G06F 17/3053* (2013.01); *G11B 27/105* (2013.01); *G11B 27/34* (2013.01); *H04N 21/4314* (2013.01); *H04N 21/4828* (2013.01)

(58) Field of Classification Search
CPC .......... G06F 17/3053; G06F 17/30867; G06F 17/30843; G06F 17/3005; H04N 21/4314; H04N 21/4828; G11B 27/105; G11B 27/34
See application file for complete search history.

(56) References Cited

U.S. PATENT DOCUMENTS

| | | | |
|---|---|---|---|
| 6,947,937 B1 * | 9/2005 | Winter ................ | G06F 17/3053 707/777 |
| 8,239,130 B1 * | 8/2012 | Upstill ............... | G01C 21/3679 701/400 |

(Continued)

FOREIGN PATENT DOCUMENTS

| | | |
|---|---|---|
| EP | 2 579 607 A1 | 4/2013 |
| WO | WO 02/37840 A2 | 5/2002 |
| WO | WO 2006/064090 A1 | 6/2006 |

OTHER PUBLICATIONS

"Tools of the Trade: RockScroll & MetalScroll", ZigguratVertigo's Hideout, Dec. 26, 2010, pp. 1-3.

(Continued)

*Primary Examiner* — Shiow-jy Fan

(57) ABSTRACT

The present invention provides a method and apparatus for representing content information. The method and apparatus for representing content information according to embodiment of the present invention notifies the user employing a mobile environment (mobile terminal or smart terminal) in a tactile, auditory, or visual manner about existence of contents having a score larger than or equal to a particular score within a predetermined distance to represented contents in a predetermined order and enables the user to perform a search for the contents desired by the user based on the user's input, providing such an advantage that the user can find the contents of interest intuitively without examining searched contents one after another.

19 Claims, 11 Drawing Sheets

(56) References Cited

U.S. PATENT DOCUMENTS

| | | | |
|---|---|---|---|
| 8,494,992 B1* | 7/2013 | Westbrook | G06Q 10/10 706/45 |
| 2003/0028889 A1* | 2/2003 | McCoskey | H04N 7/17318 725/91 |
| 2003/0098893 A1 | 5/2003 | Makinen | |
| 2004/0143598 A1* | 7/2004 | Drucker | G06F 17/30011 |
| 2005/0076093 A1* | 4/2005 | Michelitsch | G06F 17/30867 709/217 |
| 2005/0125844 A1* | 6/2005 | Maruyama | H04N 5/44543 725/135 |
| 2006/0064716 A1* | 3/2006 | Sull | G06F 17/30793 725/37 |
| 2006/0101347 A1 | 5/2006 | Runov et al. | |
| 2006/0109283 A1* | 5/2006 | Shipman | G06F 3/04815 345/629 |
| 2006/0268100 A1* | 11/2006 | Karukka | G06F 3/0482 348/14.01 |
| 2008/0215522 A1* | 9/2008 | Tanaka | G06F 17/30994 |
| 2008/0294628 A1* | 11/2008 | Shoval | G06F 17/30702 |
| 2008/0307461 A1* | 12/2008 | Tanikawa | H04N 5/44543 725/53 |
| 2009/0037273 A1* | 2/2009 | Zhu | G06Q 30/0265 705/14.62 |
| 2009/0104990 A1* | 4/2009 | Tsujino | A63F 13/04 463/32 |
| 2011/0025720 A1* | 2/2011 | Jo | G06F 3/0485 345/684 |
| 2011/0128301 A1* | 6/2011 | Kimura | H04N 1/00323 345/660 |
| 2012/0272171 A1* | 10/2012 | Icho | G06F 17/30032 715/771 |
| 2014/0236956 A1* | 8/2014 | Matsuura | G06F 17/30867 707/740 |
| 2014/0250132 A1* | 9/2014 | Pollak | G06F 17/30058 707/748 |

OTHER PUBLICATIONS

Extended European Search Report for EP Application No. 14 15 5636.5 dated Feb. 6, 2015.

* cited by examiner

METHOD AND APPARATUS OF REPRESENTING CONTENT INFORMATION USING SECTIONAL NOTIFICATION METHOD

Priority to Korean patent application number 2013-0121293 filed on Oct. 11, 2013, the entire disclosure of which is incorporated by reference herein, is claimed.

BACKGROUND OF THE INVENTION

Field of the Invention

The present invention is related to a method for representing content information, more specifically, a method for representing information of searched media contents.

Discussion of the Related Art

The trend of owning multimedia contents is changing from the practices of simply receiving and watching broadcast media to the practices of using a home media server (HMS) into which multimedia downloaded through various paths are stored. In the HMS environment, privately owned contents comprise personally recorded contents, IP-based downloaded contents, and contents downloaded from other server, the amount of which is becoming much larger than before.

Ordinary users tend to store their contents in the HMS impromptu without systematic categorization thereof. Accordingly, when family members share the same HMS environment, the number of stored contents is increased more than that in a media server managed by a single person, and organizing and managing contents is not done as properly as a media server is managed by a single person.

Despite the current practices of storing multimedia contents, users often apply separate indices to their contents for the purpose of search, perform a content search based on stored dates, or perform the content search by using contents titles or information of a series as done when searching a media storage device such as the PVR (Personal Video Recorder) for stored contents. These methods have a disadvantage in that the content search is performed depending only on the users' memory.

Various methods have been proposed to remedy the aforementioned problem; these methods also have a disadvantage that the user eventually has to examine specifics of the contents satisfying a search condition one after another to see whether the contents from the search condition are what the user is looking for. In other words, the user needs to perform a search for contents based on his or her own memory, examine specifics of the respective contents from the search, and determine whether the contents found are what the user originally wanted.

The search methods described above exhibits another problem in addition to the aforementioned one. For example, while performing a content search on sequentially stored contents looking for desired ones to watch, a user often terminates the content search when the user comes across the contents which attract the user's interest rather than terminate the content search by watching particular contents that the user looked for originally. The methods of showing the users only the contents corresponding to searched items, however, are not appropriate for the users' practices of using contents as described above.

SUMMARY OF THE INVENTION

To solve the aforementioned problem, the present invention provides a method and apparatus for representing content information enabling the user to easily recognize existence of contents satisfying a search condition while the user checks a list of contents.

In a method for representing a plurality of content information in a predetermined order, a method for representing content information according to embodiments of the present invention intended to solve the aforementioned problem comprises generating a score of at least one content; representing at least one content information in the predetermined order; and indicating existence of contents having a score larger than or equal to a first reference score within a predetermined distance to the represented contents in the predetermined order.

The generating a score of at least one content can comprise inputting a content search condition; determining whether at least one content satisfies the search condition; and assigning a score to the content according to whether the content satisfies the search condition.

The representing at least one content information in the predetermined order can include representing information of contents having a score larger than or equal to a second reference score.

The representing at least one content information in the predetermined order can include representing information of other contents in the predetermined order by operating an operating device, and the representing information of other contents can include determining a speed with which information of contents having a score larger than or equal to a first reference score and being supposed to be represented after currently represented content is changed and represented according to a logical distance to the currently represented contents.

The indicating existence of contents having a score larger than or equal to a first reference score within a predetermined distance to the represented contents in the predetermined order can include using a different method for indicating existence of contents according to a logical distance between currently represented contents and the contents having a score larger than or equal to the first reference score in the predetermined order.

The indicating existence of contents having a score larger than or equal to a first reference score within a predetermined distance from the represented contents in the predetermined order can include using a different method for indicating existence of contents according to magnitude of a score of the contents the score of which is larger than or equal to the first reference score.

The using a different method for indicating existence of contents can include setting at least one of brightness of display, strength of vibration, and magnitude of sound volume differently according to a logical distance or magnitude of a score.

The indicating existence of contents having a score larger than or equal to a first reference score within a predetermined distance to the represented contents in the predetermined order can include indicating existence of contents having a score larger than or equal to the first reference score within a predetermined distance by using at least one of display, vibration, and sound volume.

Also, in a method for representing a set of a plurality of contents in a predetermined order, a method for representing content information according to one embodiment of the present invention intended to solve the aforementioned problem comprises generating a score of at least one content; representing at least one set of contents in a predetermined order; and indicating existence of a set of contents including contents having a score larger than or equal to a predetermined value within a predetermined distance to the set of represented contents in the predetermined order.

The indicating existence of a set of contents including contents having a score larger than or equal to a predetermined value within a predetermined distance to the set of represented contents in the predetermined order can indicate existence of a content set including contents having a score larger than or equal to the predetermined reference score within a predetermined distance by using at least one of brightness of display, strength of vibration, and magnitude of sound volume.

Also, in an apparatus for representing content information representing a plurality of content information in a predetermined order, an apparatus for representing content information according to one embodiment of the present invention intended to solve the aforementioned problem comprises a representation unit representing at least one content information; and a controller generating a score of at least one content, representing at least one content information by using the representation unit in the predetermined order, and indicating existence of contents within a close distance to the represented contents in the predetermined order, for example, contents having a score larger than or equal to a first reference score within a predetermined distance to the represented contents in the predetermined order.

The controller can assign a score to the plurality of contents by using the plurality of content information and a content search condition.

The controller can represent information of contents having a score larger than or equal to a second reference score in the predetermined score.

The apparatus for representing content information can further comprise a sensor unit sensing inclination and delivering the degree of inclination to the controller, where the controller can represent information of other contents in the predetermined order by controlling the representation unit based on the degree of inclination, and the controller can determine a speed with which information of contents having a score larger than or equal to a first reference score and being supposed to be represented in the predetermined order after currently represented contents is changed and represented according to a logical distance to the currently represented contents.

The controller can use a different method for indicating existence of contents according to a score of the contents having a score larger than or equal to the first reference score.

The controller can use a different method for indicating existence of contents according to magnitude of a score of the contents the score of which is larger than or equal to the first reference score.

The controller can set at least one of brightness of display, strength of vibration, and magnitude of sound volume differently according to a logical distance of contents having a score larger than or equal to the first reference score to the currently represented contents in the predetermined order or according to magnitude of a score of contents the score of which is larger than or equal to the first reference score.

The controller can indicate existence of contents having a score larger than or equal to the first reference score within a predetermined distance by using at least one of display, vibration and sound volume.

Also, in an apparatus for representing content information representing a set of a plurality of content information in a predetermined order, an apparatus for representing content information according to one embodiment of the present invention intended to solve the aforementioned problem comprises a representation unit representing information of a set of at least one content; and a controller generating a score of at least one content, representing a set of at least one content by using the representation unit in the predetermined order, and indicating existence of a set of contents within a close distance to the set of represented contents in the predetermined order, for example, a set of contents having a score larger than or equal to a first reference score within a predetermined distance to the set of represented contents in the predetermined order.

The controller can indicate existence of a set of contents having a score larger than or equal to the predetermined score within a predetermined logical distance by using at least one of brightness of display, strength of vibration, and magnitude of sound volume.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

Figure 1:
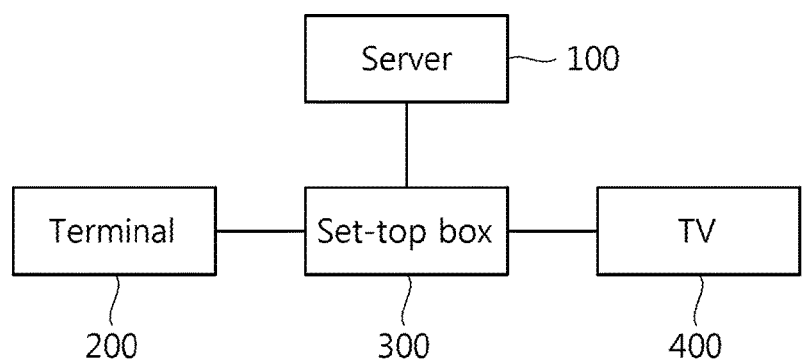
FIG. 1 is an example of a system to which a method for representing contents according to one embodiment of the present invention is applied.

The present invention can be modified in various ways and various embodiments of the present invention can be realized; thus, this document illustrates particular embodiments in the appended drawings and detailed description of the embodiment will be provided.

That is not meant, however, for limiting the present invention to the particular embodiments; rather, it should be understood to include every possible modification, equivalent, or substitute of the present invention which belongs to the technical principles and scope of the present invention.

Terms such as first and second can be used for describing various components but the components should not be limited by the terms. The terms are introduced only for the purpose of distinguishing one component from the others. For example, a first component may be called a second component without departing from the scope of the present invention and vice versa. The term of and/or indicates a combination of a plurality of related items described or any one of a plurality of related items described.

If a component is said to be "linked" or "connected" to a different component, the component may be directly linked or connected to the different component but a third component may exist to connect the two components even though the two components may be connected directly. On the other hand, if a component is said to be "linked directly" or "connected directly" to another component, it should be interpreted that there is no further component between the two components.

Terms used in this document have been introduced only to describe particular embodiment, not intended to limit the scope of the present invention. Singular expression should be interpreted to include plural expressions unless otherwise stated explicitly. Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

Unless otherwise defined, all the terms used in this document, whether they are technical or scientific, possess the same meaning as understood by those skilled in the art to which the present invention belongs. The terms such as those defined in a dictionary for general use should be interpreted to carry the same contextual meaning in the related technology, and they should not be interpreted to possess an ideal or excessively formal meaning.

In what follows, with reference to appended drawings, preferred embodiments of the present invention will be described in more detail. To help overall understanding of the present invention, the same components in the drawings use the same reference symbols, and descriptions of the same components are omitted.

In what follows, contents are defined as a concept encompassing all kinds of contents used in the home media server (HMS) environment. For example, contents recorded directly by the user from broadcast programs received through a broadcast network, contents downloaded through the IP network, or contents transmitted from other server.

FIG. 1 is an example of a system to which a method for representing contents according to one embodiment of the present invention is applied. The system to which a method for representing contents according to one embodiment of the present invention is applied comprises a server 100, terminal 200, set-top box 300, and TV 400. For example, the set-top box 300 receives contents from the server 100 through the IP network and represents the contents on the TV 400 according to the control of the terminal 200.

The terminal 200 may be a remote controller, smart phone, or tablet PC controlling the set-top box 300. The terminal 200 can have the structure of an apparatus for representing contents which represents contents by using a method for representing contents according to one embodiment of the present invention.

In another embodiment, the terminal 200 and the set-top box 300 can be integrated into an all-in-one type set-top box. For example, the terminal 200 and the set-top box 300 can be integrated together in a portable form such as a smart phone, receive contents from the server 100 through wired or wireless communication, and provide the TV 400 with contents through wire or wirelessly. In this case, the user's operation through the terminal 200 can be carried out as if the user directly operates the integrated set-top box. The integrated set-top box can have the structure of an apparatus for representing contents which represents contents by using a method for representing contents according to one embodiment of the present invention.

Figure 2:
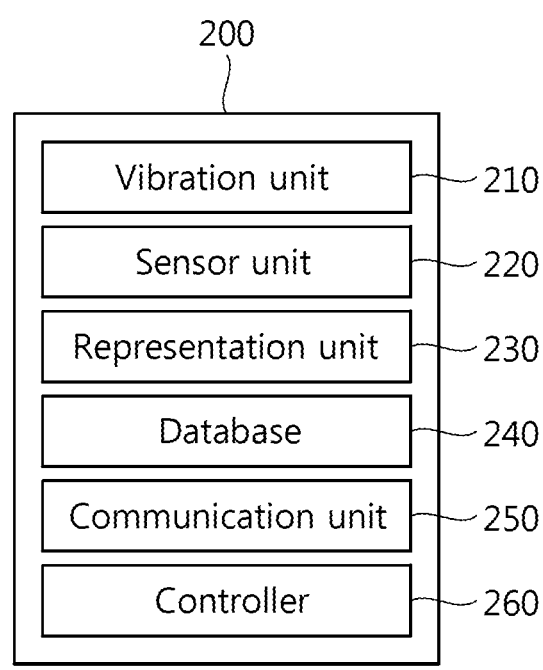
FIG. 2 is a block diagram of an apparatus for representing contents carrying out a method for providing contents according to one embodiment of the present invention.

FIG. 2 is a block diagram of an apparatus for representing contents carrying out a method for providing contents according to one embodiment of the present invention. The apparatus 200 for representing contents according to one embodiment of the present invention comprises a vibration unit 210, sensor unit 220, representation unit 230, database 240, communication unit 250, and controller 260. The vibration unit 210, sensor unit 220, representation unit 230, database 240, and communication unit 250 are not mandatory elements, and at least one of them can be omitted.

The vibration unit 210 generates vibration in the apparatus for representing contents according to the control of the controller 260. The vibration unit can include a vibration module which generates vibration. In case the apparatus for representing contents is implemented in a general-purpose device such as a smart phone, the vibration unit 210 can be configured to control the vibration module of the general-purpose device.

The sensor unit 220 can be implemented by an inertial sensor such as an accelerometer, gyroscope, impact sensor, and inclination sensor; altimeter, gravity sensor, magnetic field sensor, or a combination of the aforementioned sensors. The sensor type is not limited to the types of sensors listed up above, but the sensor unit 220 can be implemented by different types of sensors capable of detecting direction or angle of motion of the apparatus for representing contents. Also, in case the apparatus for representing contents is implemented in a general-purpose device, the sensor unit 200 can be configured to control the sensor module of the general-purpose device.

Figure 8:
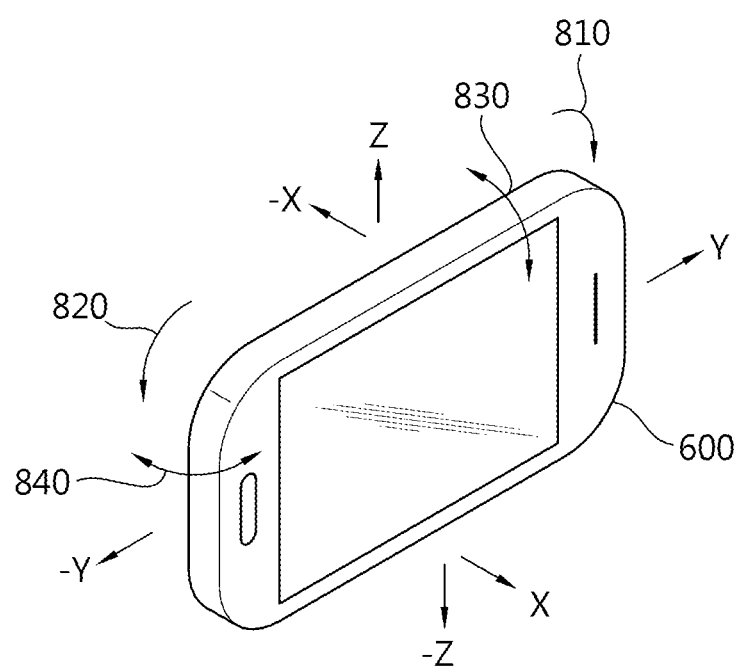
FIG. 8 is a conceptual drawing illustrating an apparatus for representing contents according to one embodiment of the present invention recognizing motion or direction of inclination of the apparatus for representing contents.

The sensing data output through the sensor unit 220 include motion information. For example, as shown in FIG. 8, the sensor unit 220 sensing acceleration of the terminal can sense acceleration along at least one direction of the reference axes, x, y, and z; and output the sensed acceleration. At this time, referring to the illustration of the terminal, x-axis corresponds to an axis meant for forward and backward movement of the terminal; y-axis meant for movement of the terminal to the left and right; and z-axis meant for up and down movement of the terminal. Different from the aforementioned setting, the x, y, z axis can be defined by taking direction of gravity into account.

The sensor unit 220 can calculate at least one of motion parameters of the terminal: direction and angle of movement; and direction and angle of inclination. The sensor unit 220 can then deliver the calculated value to the controller. On the other hand, the sensor unit 220 can deliver the sensed information to the controller so that the controller can calculate the motion of the terminal.

The sensor unit 220 can generate the calculated information by further including a computation unit which computes a rotation angle, direction, speed, movement distance, and the like according to the motion of the apparatus for representing contents by integrating measured angular and linear speed with time. The computation unit can be included in the controller 260.

The representation unit 230 displays content information and other information for the user according to the control of the controller 260. For example, the representation unit 230, to provide visual information for the user, can be realized by a display unit including a screen such as an LCD or LED panel. Also, the representation unit 230 can be realized by an audio unit including sound equipment to provide auditory information. Moreover, the representation unit can be realized by the aforementioned vibration unit 210 to provide tactile information. The representation unit 230 can be constructed by including at least one of the display unit, audio unit, and vibration unit.

Figure 3:
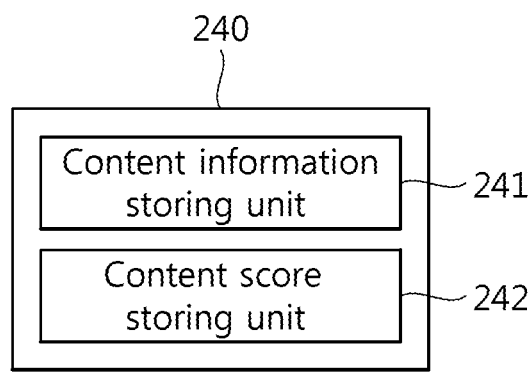
FIG. 3 illustrates the structure of a database according to one embodiment of the present invention.

The database 240 stores information of contents. FIG. 3 illustrates the structure of a database 240 according to one embodiment of the present invention. The database 240 according to one embodiment of the present invention can comprise a content information storing unit 241 and content score storing unit 242. The content information storing unit 241 can store information of contents such as DVB-SI information, EPG information, and IP-EPG information. The content score storing unit 245 can store scores of contents, calculated by using information and search conditions of the contents. The content score storing unit 242 can be included in the content information storing unit 241. As shown in FIG. 1, in case the apparatus for representing contents is implemented in the terminal 200, the database may be implemented in the set-top box 300. At this time, the terminal 200 can receive required information such as content information or content score from the database of the set-top box 300.

The communication unit 250 performs communication between the apparatus for representing contents and external devices under the control of the controller 260. The communication unit can employ any one of communication methods capable of communicating data, such as infrared communication, RFID, NFC, and LTE. For example, in the system of FIG. 1 according to one embodiment of the present invention, in case the apparatus for representing contents is implemented in the terminal 200, the communication unit performs data communication with the set-top box 300. In another embodiment, in case the apparatus for representing contents is realized in the form of an integration of the terminal 200 and the set-top box 300, the communication unit 250 receives contents by performing communication with the server 100 and enables contents play on the TV 400 from the apparatus for representing contents by performing communication with the TV 400.

The controller 260 controls the aforementioned vibration unit 210, sensor unit 220, representation unit 230, database 240, and communication unit 250, thereby making the apparatus for representing contents carry out a method for representing contents described later.

Figure 4:
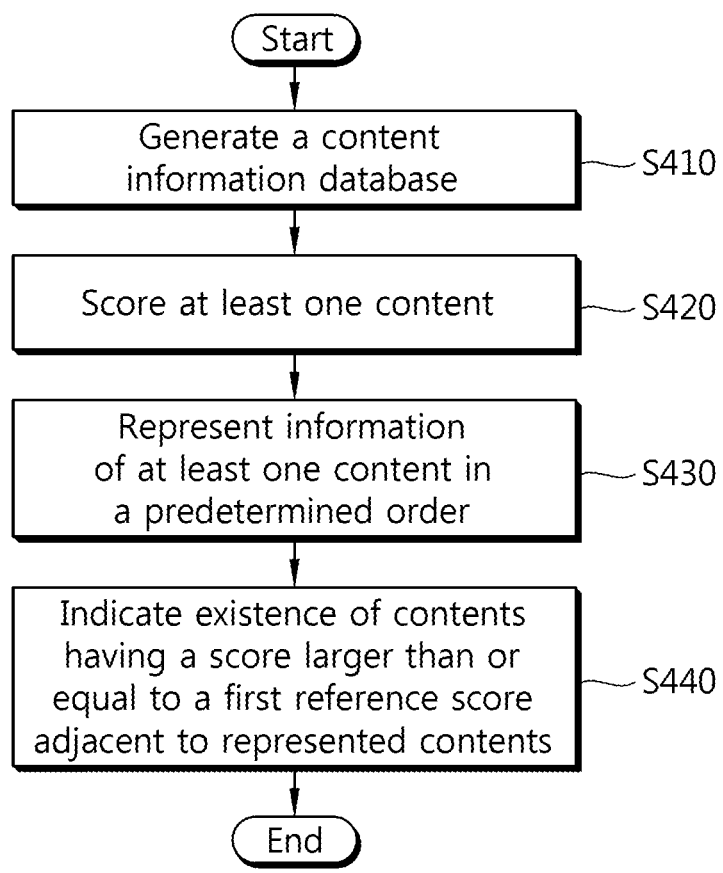
FIG. 4 is a flow diagram illustrating the steps for an apparatus for representing contents according to one embodiment of the present invention to represent contents.

FIG. 4 is a flow diagram illustrating the steps for an apparatus for representing contents according to one embodiment of the present invention to represent contents. A method for representing contents will be described with reference to FIG. 4. First, the apparatus for representing contents generates a content information database, and a database is constructed based on the content information S410. For example, the apparatus for representing contents builds a database of content information by using DVB-SI (Digital Video Broadcasting-Service Information), EPG (Electronic Program Guide) information, IP-EPG (Internet Protocol-Electronic Program Guide) information, and IP-EPG (Internet Protocol-Electronic Program Guide) information of contents, and recording dates/days of the contents. Based on information of DVB specifications, the apparatus of the present invention can extract a plurality of information such as program title, genre, appropriate age for watching the program; and time and day of recording the program.

Next, the apparatus for representing contents according to one embodiment of the present invention assigns a score to at least one content according to a predetermined search condition by using content information in the database S420.

Figure 5:
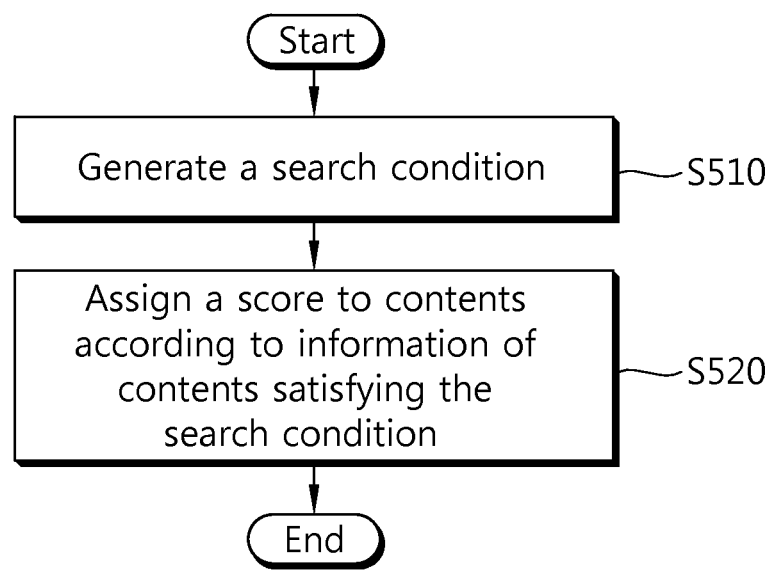
FIG. 5 is a flow diagram illustrating in more detail the steps for an apparatus for representing contents according to one embodiment of the present invention to assign a score to content.

FIG. 5 is a flow diagram illustrating in more detail the steps to assign a score to the content S420. With reference to FIG. 5, the step of assigning a score to the content S420 comprises generating a search condition S510 and assigning a score to content in accordance with the information of the content corresponding to the search condition.

Figure 6:
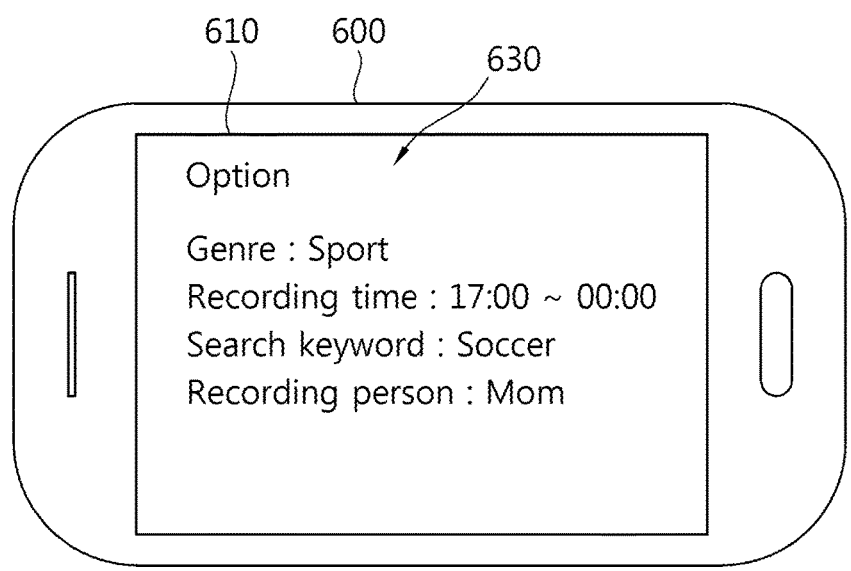
FIG. 6 illustrates a user interface of an apparatus for representing contents according to one embodiment of the present invention.

In the step of generating a search condition S510, the search condition may be predetermined or stored previously. Also, the search condition can be determined arbitrarily according to the user input. In this regard, FIG. 6 illustrates a user interface of an apparatus for representing contents receiving a search condition. FIG. 6 illustrates an apparatus for representing contents 600 according to one embodiment of the present invention and a screen 610 of the apparatus for representing contents. The screen 610 shows search conditions 630 in the form of an option. As shown in FIG. 6, the search conditions may include search fields such as genre, recording time, search keywords, and recording person. The search conditions shown in FIG. 6 are exemplary; additional search conditions can be included in the search conditions, or part of them can be omitted.

Once the search conditions are determined, the apparatus for representing contents according to one embodiment of the present invention assigns a score to content by using the search conditions and content information S420. The apparatus for representing contents generates search scores for the respective contents. The search score can be calculated according to predetermined search conditions.

For example, in regard to particular content within a database, if information of the particular content does not satisfy a particular search condition, a search score of zero is assigned to the corresponding content as regards to the corresponding particular search condition. On the other hand, if the information perfectly matches the search condition, a search score of 100 will be assigned to the corresponding content. In this manner, if particular content match a search condition by x %, a search score of x will be assigned to the content. By averaging calculated scores of the respective search conditions, a search score for the particular content can be determined.

Also, a weighting factor can be assigned to each search condition. For example, a weighting factor of 50% is assigned to the search condition using a contents title, and in case particular content matches the contents title, a higher score can be assigned to the particular contents than to other contents satisfying different search conditions.

Also, the apparatus for representing contents can display individual contents on the screen in a column; or in the form of a circle, rectangle, triangle, or other shape by using the representation unit. The whole contents can be displayed on one screen together, or only part of them can be displayed on one screen. Moreover, the apparatus for representing contents can determine the number of contents displayed on the screen beforehand according to the user's selection. The contents to be displayed on the screen can also be determined depending on the storage folder of the contents.

On the other hand, the apparatus for representing contents according to one embodiment of the present invention can display all of the content items or those content items having a score larger than a particular value in a predetermined order. For example, the apparatus for representing contents can represent only the contents which have obtained a score larger than a particular value (a second reference score) or represent all of the contents independently of search conditions. Similarly, the apparatus for representing contents can represent all of such contents that are related to at least one of a plurality of search conditions.

The first and the second reference score are predetermined by default or by the user. Also, the first and the second reference score can be determined in relation to the distribution of content scores. For example, in a distribution of content scores, a reference score for the top 30% of the content scores can be the first reference score while a reference score for the top 70% of the content scores can be the second reference score.

Figure 7:
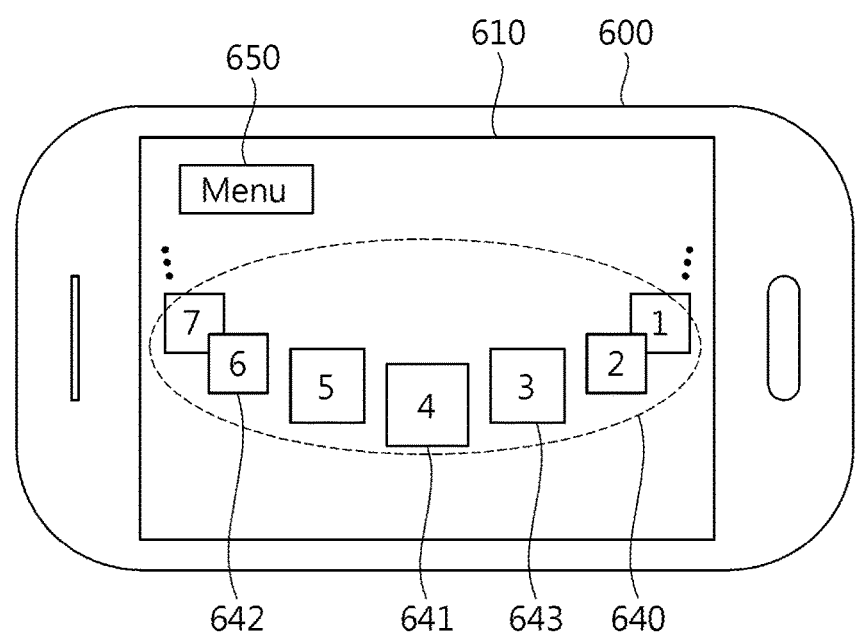
FIG. 7 illustrates the structure of a screen in which contents are represented in an apparatus for representing contents according to one embodiment of the present invention.

FIG. 7 illustrates the structure of a screen in which contents are represented in an apparatus for representing contents according to one embodiment of the present invention. FIG. 7 displays content items 640 1 to 7 and a menu button 650 represented in the screen 610 of the apparatus for representing contents 600 of FIG. 6. Content items to be shown according to a display order before the first content item and after the seventh content item can be represented in a small size, thereby helping the user recognize existence of subsequent content items. A plurality of content information is represented along with a user menu in the screen of a user terminal. Individual content items correspond to the respective contents, and each content item itself can represent at least one information of the corresponding content. Moreover, in case a particular item is selected, content information related to the corresponding item can be displayed separately in the screen or in the form of a popup window.

Content items different from each other can be displayed on the screen according to the user's operation. For example, content items can be represented according to the user's operation so that they are shifted cyclically to the left or right in a predetermined order. In this way, content items are represented as they are moved to the left or right, and contents are displayed on the screen according to a predetermined order. The content items can be represented to the user in various ways in addition to the aforementioned method.

The user operation can be generated as the user operates a button of the apparatus for representing contents or by the user's voice. Also the user operation can be generated as the user moves or inclines the apparatus for representing contents.

FIG. 8 is a conceptual drawing illustrating directions of motion or inclination of an apparatus for representing contents recognized by the apparatus for representing contents. The apparatus for representing contents can recognize motion of the apparatus for representing contents along x, y, and z axis. Also, the apparatus recognizes inclination along directions of 810, 820, 830, and 840. Along the direction of motion or inclination, the apparatus for representing contents can represent movement of content items, and according to the movement of the content items, the current content items 641 displayed in the middle of the screen can be changed. In the example of FIG. 7, the current content item is the content item 641 represented by the number 4. For example, in case the terminal inclines to the direction of 820, with reference to FIG. 7, content items move sequentially to the left (a direction along which the content item of number 4 641 moves toward the content item of number 6 642); the content item located to the right of the current content item 641 before movement is represented as a new current content item displayed in the middle of the screen.

The apparatus for representing contents can adjust a movement speed of content items in regard to intensity of operation. For example, in the case of continuous button operation on the apparatus for representing contents, content items can be made to move with a speed faster than that applied for discrete button operation. Similarly, movement of the content items can be accelerated in proportion to the inclination angle of the apparatus for representing contents. In the same way, the larger the speed of the apparatus for representing contents becomes, the faster the movement speed of content items can be made.

Next, an apparatus for representing contents according to one embodiment of the present invention indicates existence of contents having a score larger than or equal to a first reference score around the represented contents S440. For example, the apparatus for representing contents according to one embodiment of the present invention indicates existence of content items having a score larger than or equal to the first reference score within a logically close distance to represented content items according to the predetermined order. To be more specific, the apparatus for representing contents according to one embodiment of the present invention can notify the user about existence of a target content item having a score larger than or equal to the first reference score within a predetermined logical distance to the current content items 641 displayed currently in the middle of the screen according to the predetermined order.

For example, in case a content item located within a logical distance as the logical distance is sufficiently large (for example, the logical distance can be defined to be a value larger than the longest distance determined by a current content item 641 displayed in the middle of the screen and a particular content item displayed on the screen), but not displayed on the screen has a score larger than or equal to the first reference score, the apparatus for representing contents can notify the user of existence of the content item. Also, as the logical distance is sufficiently small, the apparatus for representing contents can indicate existence of content items having a score larger than or equal to the first reference score among content items displayed on the screen. In this case, the apparatus for representing contents assigns a separate mark to the contents having a score larger than or equal to the first reference score or highlights the contents, thereby indicating the contents having a score larger than or equal to the first reference score.

Meanwhile, the logical distance refers to an arrangement distance among content items according to a predetermined order. For example, it is the same concept as the number of content items located between a first content item and a second content item according to an arbitrary arrangement order of the content items. In case a second, third, and fourth item are located between a first and a fifth item, the distance between the first and the fifth item is defined to be 3. In other words, in the example of FIG. 7, the logical distance between the fourth content item, which is a current content item 641, and the third content item 643 is 0. Also, the logical distance between the current item 641 and the sixth content item 642 is 1. The first reference score can be predetermined by an arbitrary value or set to an arbitrary value by the user.

In what follows, a current content item displayed in the middle of a current screen is defined to be a current content item, and it corresponds to the fourth content item in the example of FIG. 7. And the content corresponding to the current content item is defined to be current content. Furthermore, the content having a score larger than or equal to the first reference score is defined to be target content while an content item representing the target content is defined to be a target content item.

The apparatus for representing contents according to one embodiment of the present invention can notify the user of existence of contents having a score larger than or equal to the first reference score within a predetermined logical distance to a current content item by using at least one of adjusting the screen to be brighter than current brightness, flickering the screen, darkening the screen, representing a particular message to the user, representing particular vibration to the user, and generating a particular sound.

Also, the apparatus for representing contents according to one embodiment of the present invention can use a different method for indicating existence of contents according to a logical distance between current content and target content having a score larger than or equal to the first reference score in the predetermined order. For example, in case the target content item having a score larger than or equal to the first reference score is located within a logical distance of 5 to the current content item displayed in the middle of the current screen, the apparatus for representing contents according to one embodiment of the present invention can notify the user by using vibration; the apparatus can generate stronger vibration as the logical distance between the target content item and the current content item gets smaller. Also, the apparatus for representing contents according to another embodiment of the present invention can be configured to generate vibration when target contents are located within a logical distance of 10 to the current contents while the apparatus can be configured to generate a particular sound when target contents are located within a logical distance of 5 to the current contents.

Furthermore, the apparatus for representing contents according to one embodiment of the present invention can use a different method for indicating existence of content according to magnitude of a score of the content the score of which is larger than or equal to the first reference score. For example, the apparatus for representing contents according to one embodiment of the present invention can configure at least one of brightness of display, strength of vibration, and magnitude of sound volume differently according to a score of adjacent content. For example, in case a distribution of scores for contents ranges from 0 to 100 and contents having a score larger than or equal to 50 are found within a predetermined logical distance to a current content item, the apparatus for representing contents can indicate existence of the contents by using vibration. And in case contents having a score larger than or equal to 70 are found within a predetermined logical distance to the current content item, the apparatus can increase brightness of the display or can make the display flicker. Similarly, in case contents having a score larger than or equal to 90 are found within a predetermined logical distance to the current content item, the apparatus can indicate existence of contents having a score larger than or equal to 90 within a predetermined logical distance to a current content item by using a particular sound.

In addition, the apparatus for representing contents according to one embodiment of the present invention can set a speed with which contents are moved and changed in proportion to a distance of target content to current content. For example, by using a speed in proportion to a logical distance determined in a predetermined order between the current content and contents having a score larger than or equal to the first reference score, the content information can be changed and represented. In case the distance from location of the current content to the nearest target content is large, a movement speed for content items toward the nearest target content is made to be fast, whereas the movement speed can be made to be normal in case the distance from the current content to the nearest target content is small.

Similar to the above, if a predetermined logical distance to the current content is referred to as a valid distance, in case no target content is found within the valid distance, the movement speed of content items can be made fast until at least one target content is found within the valid distance. At this time, as described above, the movement speed can be adjusted in proportion to the distance of a content item to the boundary of the valid distance. The movement speed of a content item can also be adjusted according to a distance between the current content and the target content even when the target content item is found within the valid distance.

Besides, the apparatus for representing contents according to one embodiment of the present invention can represent a set of contents in the form of an item displayed on a screen. In this case, the item displayed on the screen represents a set of contents, and along with the item, brief information of the corresponding set of contents can be shown.

Yet, the apparatus for representing contents according to one embodiment of the present invention can indicate existence of a set of contents including contents having a score larger than or equal to a predetermined score within a logically close distance to the set of represented contents in a predetermined order.

What is more, the apparatus for representing contents according to one embodiment of the present invention can indicate existence of contents having a score larger than or equal to the predetermined score within a predetermined logical distance by using any one of brightness of display, strength of vibration, and magnitude of sound volume. The apparatus for representing contents according to one embodiment of the present invention can represent information of contents being included in a set of represented contents and having a score larger than or equal to a predetermined score together with information of the set of represented contents.

Figure 9:
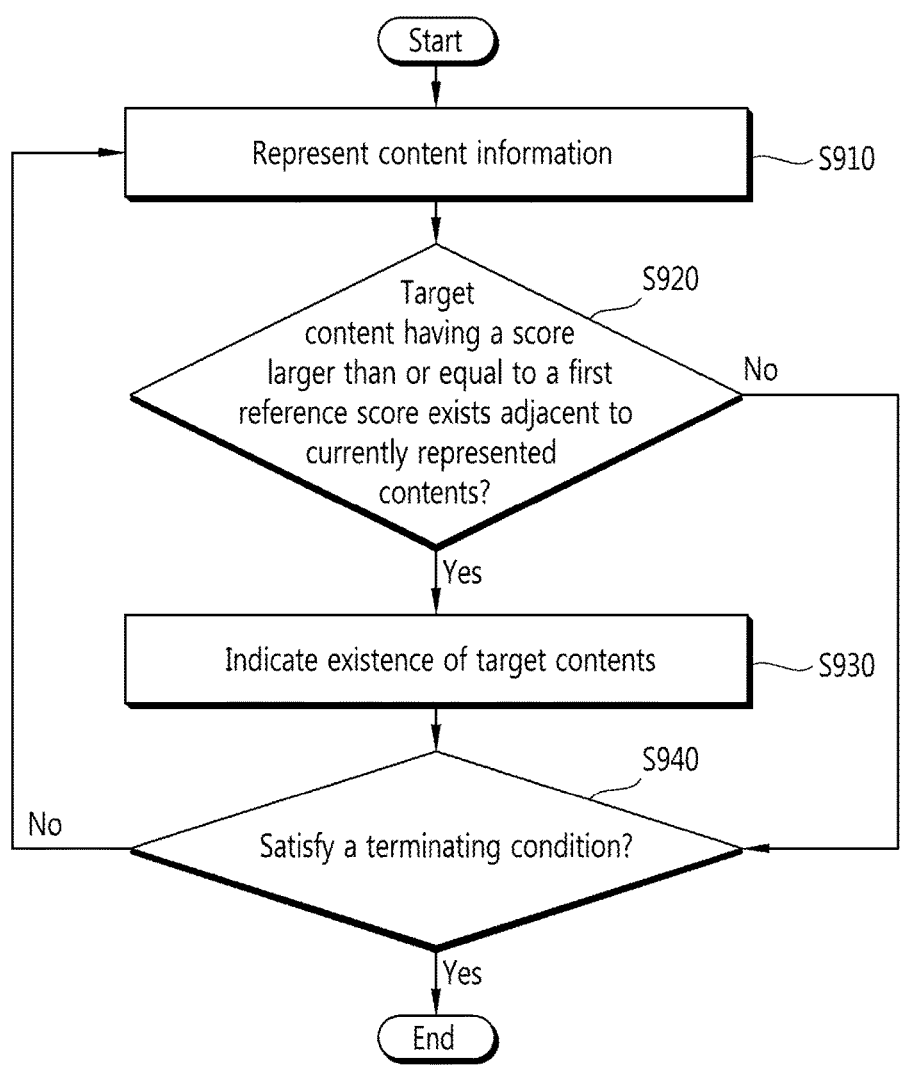
FIG. 9 is a flow diagram of a method for representing contents according to one embodiment of the present invention.

FIG. 9 is a flow diagram of a method for representing contents according to one embodiment of the present invention. With reference to FIG. 9, steps of carrying out a method for representing contents according to one embodiment of the present invention will be described. First, the apparatus for representing contents according to one embodiment of the present invention represents content information S910. Next, the apparatus determines whether target content having a score larger than or equal to a first reference score is found around currently represented content S920. If target content having a score larger than or equal to the first reference score is found, the apparatus for representing contents represents existence of the target content S930. Next, after representing existence of the target content, the apparatus for representing contents determines whether the current state corresponds to a terminating condition S940. If the current state corresponds to the terminating condition, the apparatus for representing contents terminates representation of content information; otherwise, the apparatus repeats the steps from the initial step S910 of representing content information. It should be noted that the terminating condition includes the case where the user terminates a content search. For example, the aforementioned case may correspond to a situation where the user stops the content search. The user stops operating the apparatus when receiving a strong alarm related to target content and checks whether a represented content item corresponds to the content that the user is looking for. In case searched content coincides with the content that the user is looking for, the user can stop the content search and request play of the corresponding content.

Figure 10:
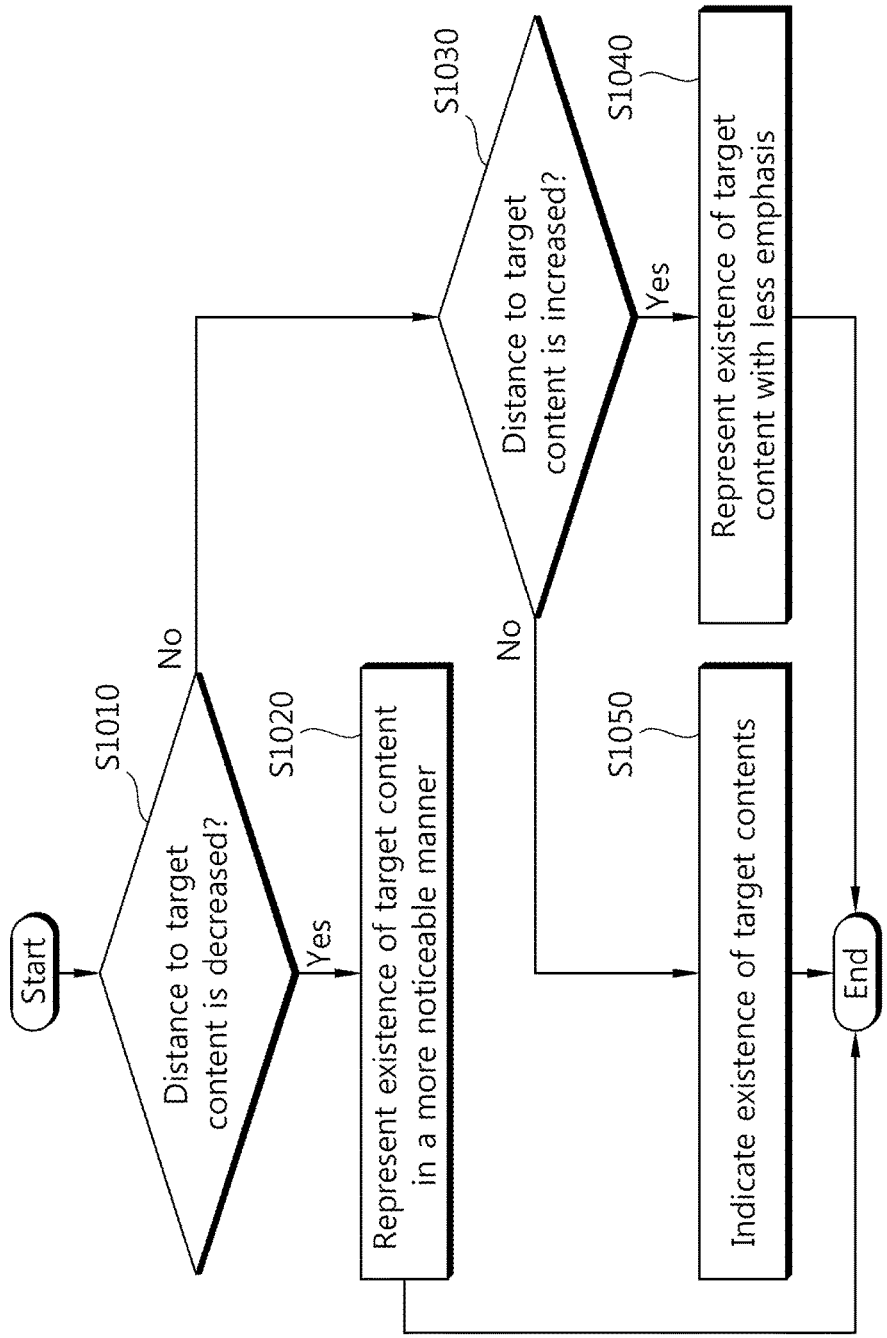
FIG. 10 is a flow diagram illustrating in more detail the steps of indicating existence of target contents of FIG. 9.

FIG. 10 is a flow diagram illustrating in more detail the steps of indicating existence of target contents of FIG. 9. First, an apparatus for representing contents determines whether distance to target content is decreased S1010. In case it is determined that distance to target content is decreased, the apparatus for representing contents represents existence of the target content in a more noticeable manner S1020. In the opposite case, however, the apparatus for representing contents determines whether distance to the target content is increased S1030. In case it is determined that distance to the target content is getting larger, the apparatus for representing contents represents existence of the target content with less emphasis S1040. If distance to the target content is determined not to be getting smaller, the apparatus for representing contents represents existence of the target content without varying intensity of representing the target content S1050.

Figure 11:
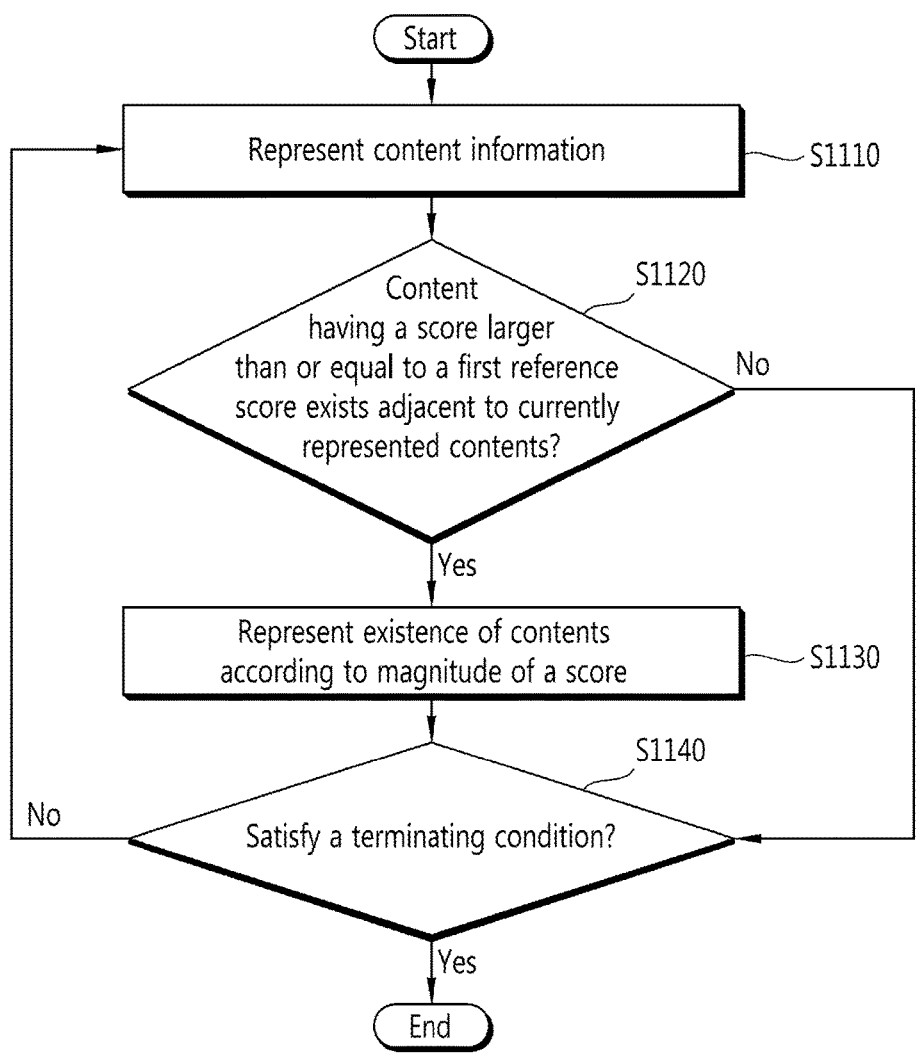
FIG. 11 is a flow diagram of a method for representing contents according to another embodiment of the present invention.

FIG. 11 is a flow diagram of a method for representing contents according to another embodiment of the present invention. First, the apparatus for representing contents according to one embodiment of the present invention represents content information S1110. Next, the apparatus determines whether target content having a score larger than or equal to a first reference score is found around currently represented content S1120. If target content is found, the apparatus for representing contents represents existence of the target content according to magnitude of the score thereof. For example, existence of the target content can be represented by using at least one of brightness of display, vibration, and sound S1130. As the score of the target content becomes larger, stronger brightness, vibration, and sound can be employed to represent existence of the target contents. After existence of the target content is not represented as the target content is not found, or the target content is represented, the apparatus for representing contents determines whether a terminating condition is met. As described above, the terminating condition corresponds to a condition based on which the user stops a content search. If the terminating condition is met, the apparatus for representing contents terminates representation of content items. If the terminating condition is not met, however, the apparatus for representing contents repeats the steps from the initial step S1110 of representing content information.

Though this document provides descriptions of the present invention based on a series of functional blocks, the present invention are not limited to the above embodiments and appended drawings, but it should be clearly understood to those skilled in the art to which the present invention belongs that various substitutions, modifications, and changes can be made to the embodiments without departing from the technical scope off the present invention.

Combinations of the embodiments described above are not limited to the examples of this document. Rather, combinations of various other forms as well as the aforementioned embodiments can be made according to implementation and/or needs.

In the embodiments described above, although methods have been described through a series of steps or a block diagram, the present invention is not limited to the order of steps and some step can be carried out in a different order and as a different step from what has been described above, or some step can be carried out simultaneously with other steps. Also, it should be understood by those skilled in the art that those steps described in the flow diagram are not exclusive; other steps can be incorporated to those steps; or one or more steps of the flow diagram can be removes without affecting the technical scope of the present invention.

The embodiments described above include various forms of examples. Though it may be impossible to describe all the possible combinations to illustrate the various other forms, it should be understood by those skilled in the art that other combinations are possible. Therefore, it should be understood that the present invention includes all of the other substitutions, modifications, and changes belonging to the technical scope defined by the appended claims.

A method and apparatus for representing content information according to embodiments of the present invention notifies the user employing a mobile environment (mobile terminal or smart terminal) in a tactile, auditory, or visual manner about existence of contents having a score larger than or equal to a particular score within a predetermined distance to represented contents in a predetermined order and enables the user to perform a search for the contents desired by the user based on the user's input, providing such an advantage that the user can find the contents of interest intuitively without examining searched contents one after another.

What is claimed is:

1. A method for representing content, the method comprising:

receiving a content search condition including information for searching a target content item from a user;

determining whether at least one of a plurality of content items satisfies the content search condition by generating scores corresponding to the plurality of content items, the scores being related to a degree of satisfaction between the content search condition and content information on the plurality of content items;

representing, by an operating device on a screen, the plurality of content items by displaying the plurality of content items in a predetermined order, the plurality of content items including a current content item and the target content item, the current content item being displayed in the middle of the screen, the target content item being displayed a logical distance from the current item on the screen, the logical distance being shorter than a predetermined distance;

moving through the plurality of content items in the predetermined order at a movement speed by changing the current content item in response to the user's operation; and indicating the target content item when the target content item has a score larger than or equal to a first reference score, the target content item being indicated by changing the movement speed of the plurality of content items in proportion to the logical distance between the current content item and the target content item, wherein the logical distance is defined by an arrangement distance among the plurality of content items displayed on the screen, wherein the arrangement distance is a distance among the content items displayed in the predetermined order on the screen.

2. The method of claim 1, further comprising:

when no target content item is found within the predetermined distance, increasing the movement speed of content items until at least one target content item is found in the predetermined distance.

3. The method of claim 1, wherein the representing the plurality of content items in the predetermined order includes indicating content items having a score larger than or equal to a second reference score, the second reference score being different from the first reference score.

4. The method of claim 2, further comprising:

when the logical distance between the current content item and the target content item is large, increasing the movement speed for content items toward the target content item; and when the logical distance between the current content item and the target content item is small, decreasing the movement speed for content items toward the target content item.

5. The method of claim 3, wherein a reference score of the top 30% of the content scores is the first reference score and a reference score of the top 70% of the content scores is the second reference score.

6. The method of claim 1, wherein the arrangement distance is defined by a number of content items located between a first content item and a second content item displayed according to the predetermined order.

7. The method of claim 1, wherein indicating the target content item includes indicating the target content item using a different scheme according to a magnitude of the score of the target content item.

8. The method of claim 7, wherein the different scheme includes setting at least one of brightness of a display, a strength of vibration, and a magnitude of sound volume differently according to the logical distance or the magnitude of the score of the target content item.

9. The method of claim 1, wherein indicating the target content item includes changing at least one of a display, a vibration, and a sound volume according to the logical distance between the current content item and the target content item.

10. The method of claim 1, wherein the content search condition comprises search fields in a form of an option on the screen, wherein the search fields include genre, recording time, search keyword, and recording person.

11. The method of claim 1, wherein a weighting factor is assigned to each content search condition, wherein a score of a particular content item is determined by averaging scores of the respective content search conditions.

12. The method of claim 1, wherein a number of the content items displayed on the screen is determined by a user based on a distribution of content scores.

13. An apparatus for representing content information representing a plurality of content information in a predetermined order, the apparatus comprising:

at least one processor and memory that executes non-transitory computer program code stored on storage media, wherein the non-transitory computer program code includes instructions for:

receiving a content search condition including information for searching a target content item from a user;

determining whether at least one of a plurality of content items satisfies the search condition by generating a score of each of the plurality of content items, the score being related to a degree of satisfaction between the content search condition and content information of the at least one content item;

representing, by an operating device on a screen, the plurality of content items in the predetermined order, each of a current content item and a target content item corresponding to one of the plurality of content items being represented, the current content item being represented in the middle of the screen, the target content item being displayed within a predetermined distance from the current content item;

moving through the displayed plurality of content items in the predetermined order at a movement speed by changing the current content item in response to the user's operation; and indicating, on the screen, the target content item when the score of the target item is larger than or equal to a first reference score, the target content item being indicated by changing the movement speed of the plurality of content items in proportion to a logical distance between the current content item and the target content item, wherein the logical distance is defined by an arrangement distance among the plurality of content items displayed on the screen, wherein the arrangement distance is a distance among the content items displayed in the predetermined order on the screen.

14. The apparatus of claim 13, further comprising:

when no target item is found within the predetermined distance, increasing the movement speed of content items until at least one target content item is found in the predetermined distance.

15. The apparatus of claim 14, further comprising:

when the logical distance between the current content item and the target content item is large, increasing the movement speed for content items toward the target content item; and when the logical distance between the current content item and the target content item is small, decreasing the movement speed for content items toward the target content item, wherein the logical distance is defined by a number of content items located between the current content item and the target content item.

16. The apparatus of claim 13, wherein the at least one processor represents content items having a score larger than or equal to a second reference score, the second reference score being different from the first reference score.

17. The apparatus of claim 13, wherein the at least one processor uses a different scheme for indicating content items with scores larger than or equal to the first reference score.

18. The apparatus of claim 17, wherein the different scheme includes changing at least one of brightness of display, strength of vibration, and magnitude of sound volume according to the logical distance between the current content item and the target content item or according to magnitude of the score of the target content item.

19. The apparatus of claim 13, wherein the at least one processor indicates the target content item by changing at least one of a display, a vibration, and a sound volume according to a logical distance between the current content item and the target content item.

\* \* \* \* \*